(12) United States Patent
Lee

(10) Patent No.: US 10,291,943 B2
(45) Date of Patent: May 14, 2019

(54) NODE INTERWORKING WITH BASE STATION AND METHOD FOR PROVIDING STREAMING DATA THROUGH THE NODE

(71) Applicant: SK Telecom Co., Ltd., Seoul (KR)

(72) Inventor: Jongmin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/622,934

(22) Filed: Jun. 14, 2017

(65) Prior Publication Data
US 2017/0289592 A1    Oct. 5, 2017

Related U.S. Application Data

(63) Continuation of application No. PCT/KR2016/001459, filed on Feb. 13, 2016.

(30) Foreign Application Priority Data

Feb. 13, 2015  (KR) .................. 10-2015-0022525

(51) Int. Cl.
*H04N 21/24* (2011.01)
*H04N 21/2187* (2011.01)
(Continued)

(52) U.S. Cl.
CPC ....... *H04N 21/2402* (2013.01); *H04L 65/605* (2013.01); *H04L 67/28* (2013.01);
(Continued)

(58) Field of Classification Search
CPC ........... H04N 21/2402; H04N 21/2187; H04N 21/234; H04N 21/44209; H04N 21/44213; H04N 21/854; H04W 88/08
See application file for complete search history.

(56) References Cited

U.S. PATENT DOCUMENTS 7,996,540 B2    8/2011  Yang
8,544,052 B2    9/2013  Park et al.
(Continued)

FOREIGN PATENT DOCUMENTS

| JP | 2003-522437 A | 7/2003 |
| JP | 2004-524775 A | 8/2004 |
| WO | 2014/058237 A1 | 4/2014 |

OTHER PUBLICATIONS

International Search Report for PCT/KR2016/001459 dated Jun. 8, 2016, citing the above reference(s).
(Continued)

*Primary Examiner* — Junior O Mendoza
(74) *Attorney, Agent, or Firm* — Hauptman Ham, LLP

(57) ABSTRACT

A node interworks with and is connected to at least one base station (BS). The BS-interworking node includes a monitoring module, an event detecting module, and a media processing module. The monitoring module monitors MPEG media transport (MMT) streaming data being delivered from a live streaming server to a terminal. The event detecting module detects whether predetermined event information is contained in the monitored streaming data. The media processing module replaces a media processing unit (MPU) of the streaming data with a predetermined event unit if the predetermined event information is detected from the streaming data, and delivers the streaming data having the replaced event unit to the terminal.

8 Claims, 7 Drawing Sheets

(51) Int. Cl.
    *H04N 21/234*      (2011.01)
    *H04N 21/442*      (2011.01)
    *H04N 21/854*      (2011.01)
    *H04L 29/06*      (2006.01)
    *H04N 21/2668*      (2011.01)
    *H04L 29/08*      (2006.01)
    *H04W 88/08*      (2009.01)
    *H04W 88/12*      (2009.01)

(52) U.S. Cl.
    CPC ....... *H04N 21/2187* (2013.01); *H04N 21/234* (2013.01); *H04N 21/23424* (2013.01); *H04N 21/2668* (2013.01); *H04N 21/44209* (2013.01); *H04N 21/44213* (2013.01); *H04N 21/854* (2013.01); *H04W 88/08* (2013.01); *H04W 88/12* (2013.01)

(56) References Cited

U.S. PATENT DOCUMENTS

| | | | |
|---|---|---|---|
| 8,561,109 B2 | 10/2013 | Asbun et al. | |
| 8,611,428 B1 | 12/2013 | Huang et al. | |
| 2004/0261100 A1* | 12/2004 | Huber | H04N 7/088 725/32 |
| 2012/0113269 A1* | 5/2012 | Birch | H04N 5/44 348/192 |
| 2013/0144723 A1* | 6/2013 | Green | G06Q 30/0277 705/14.61 |
| 2014/0281009 A1 | 9/2014 | Moorthy et al. | |
| 2017/0064371 A1* | 3/2017 | Kitazato | H04N 5/278 |
| 2017/0155930 A1* | 6/2017 | Park | H04N 21/234 |
| 2017/0257647 A1* | 9/2017 | Iguchi | H04N 21/231 |

OTHER PUBLICATIONS

Lim et al., "MMT: An Emerging MPEG Standard for Multimedia Delivery over the Internet," IEEE MultiMedia, vol. 20, No. 1, Feb. 13, 2013, Abstract (1 page).

Japanese Office Action dated Oct. 18, 2018, issued in corresponding Japanese Patent Application No. 2017-554231, citing the above references.

* cited by examiner

NODE INTERWORKING WITH BASE STATION AND METHOD FOR PROVIDING STREAMING DATA THROUGH THE NODE

CROSS-REFERENCE TO RELATED APPLICATIONS

The present application is a continuation of International Patent Application No. PCT/KR2016/001459, filed on Feb. 13, 2016, which is based upon and claims the benefit of priority to Korean Patent Application No. 10-2015-0022525, filed on Feb. 13, 2015. The disclosures of the above-listed applications are hereby incorporated by reference herein in their entirety.

TECHNICAL FIELD

The disclosure relates to streaming data providing technology and, more particularly, to a node connected to and interworking with at least one base station and a method for providing streaming data through the node.

BACKGROUND ART

The statements in this section merely provide background information related to the disclosure and do not necessarily constitute prior art.

With the recent advent of various video services in the Internet environment, the demand for high-definition live broadcasting is gradually increasing. In addition, various attempts to provide such video services in a live streaming manner are made in these days.

Streaming refers to the transmission of content, such as video or audio, from a server to a client's terminal over a network such as the Internet. Since data is processed as if water is flowing, it is called streaming. The server divides the data into a plurality of packets to be delivered to the client, and the client collects such packets received from the server, restores the packets to their original form, and plays them. At this time, playback and packet reception occur simultaneously. A series of related packets is called a stream, and a set of such packets is called streaming data.

However, typical streaming data services have a problem of hardly providing an additional service based on streaming data since it is difficult to perform the analysis and access control for the streaming data delivered from a server to a terminal.

Meanwhile, MPEG-2 TS (Transport System) has been used mainly for media transmission in various industrial fields such as terrestrial and satellite digital broadcasting, DMB, and IPTV after standardization. In recent years, the fields of MPEG-2 TS have been expanded to media storage in digital video cameras and Blu-ray devices. However, the recent network environment is rapidly changing, and new requirements such as multimedia transmission technique in various heterogeneous network environments are required. Accordingly, a new technology standard for providing a variety of contents and services in various sophisticated network environments is now needed, and thus MMT (MPEG Media Transport) technology is being developed.

SUMMARY

In order to solve the above-discussed problems, the disclosure has an object of implementing a node for interworking with a base station and a method for providing streaming data through the node by using the moving picture experts group (MPEG) media transport (MMT) technology.

Another object of the disclosure is to implement a streaming data providing method through a node connected to and interworking with at least one base station and capable of changing a certain media processing unit (MPU) of MMT streaming data, delivered from a live streaming server to a terminal, to a predetermined event unit and thereby providing various additional services through the event unit.

Still another object of the disclosure is to implement a streaming data providing method through a node connected to and interworking with at least one base station and capable of collecting user information for each terminal connected to each base station, changing a certain MPU of MMT streaming data, delivered from a live streaming server to the terminal, to a targeted event unit to the user information, and thereby providing a user-customized additional service.

However, the disclosure is not limited to the above objects, and any other object, even though not mentioned herein, may be well understood from the following description.

In order to accomplish the above objects, a node according to an embodiment of the disclosure interworks with and is connected to at least one base station (BS). The BS-interworking node comprises a monitoring module configured to monitor MPEG media transport (MMT) streaming data being delivered from a live streaming server to a terminal; an event detecting module configured to detect whether predetermined event information is contained in the streaming data monitored by the monitoring module; and a media processing module configured to replace a media processing unit (MPU) of the streaming data with a predetermined event unit if the event detecting module detects the predetermined event information from the streaming data, and to deliver the streaming data having the replaced event unit to the terminal.

In order to accomplish the above objects, a method for providing streaming data through a node interworking with and connected to at least one base station (BS) comprises steps of monitoring MPEG media transport (MMT) streaming data being delivered from a live streaming server to a terminal; detecting whether predetermined event information is contained in the monitored streaming data; replacing a media processing unit (MPU) of the streaming data with a predetermined event unit if the predetermined event information is detected from the streaming data; and delivering the streaming data having the replaced event unit to the terminal.

In addition, the disclosure may further provide a non-transitory computer-readable recording medium storing a program for executing the aforesaid streaming data providing method.

According to the node interworking with the base station and the method for providing streaming data through the node of the disclosure, it is possible to effectively provide streaming data through the node by using the MMT technology.

Additionally, according to the disclosure, the node which is connected to and interworking with at least one base station can change a selected MPU of MMT streaming data, delivered from a live streaming server to a terminal, to a predetermined event unit, and thus effectively provide various additional services through the event unit.

Further, according to the disclosure, the node which is connected to and interworking with at least one base station can collect user information for each terminal connected to each base station, change a selected MPU of MMT streaming data, delivered from a live streaming server to the terminal, to a targeted event unit to the user information, and thereby provide a user-customized additional service.

Other various advantages and effects will be disclosed explicitly or implicitly in embodiments of the disclosure to be described below in detail.

DETAILED DESCRIPTION

Figure 1:
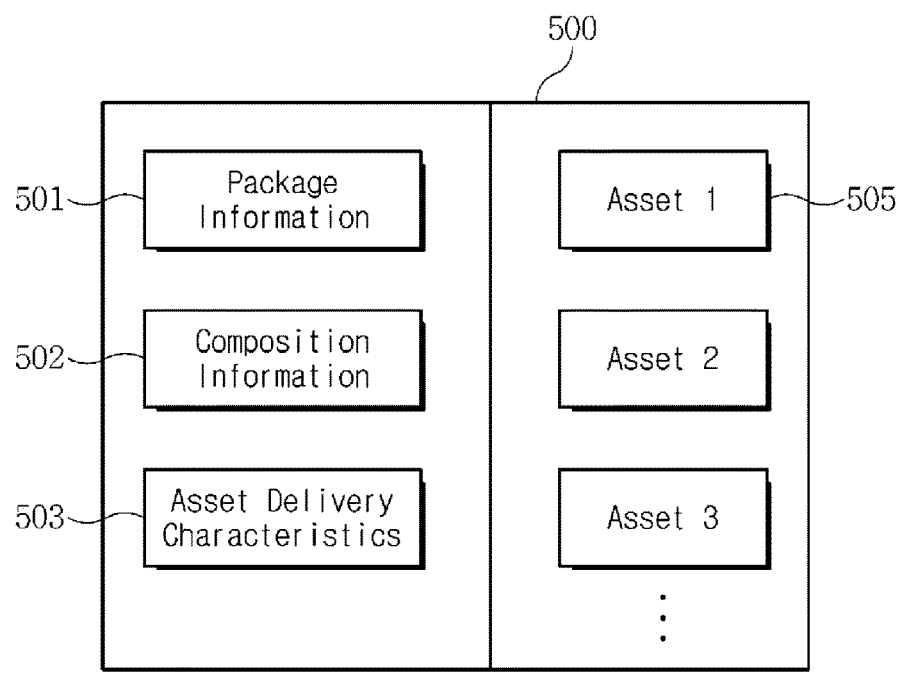
FIGS. 1 and 2 are exemplary diagrams illustrating MMT technology applied to the disclosure.

Hereinafter, embodiments of the disclosure will be described in detail with reference to the accompanying drawings.

In the following description and the accompanying drawings, well-known functions or elements may not be described or illustrated in detail to avoid obscuring the subject matter of the disclosure. The same elements may be denoted by the same reference numerals throughout the drawings.

The terms and words used herein should not be construed as limited to ordinary or dictionary definition terms, but should be construed in light of the meanings and concepts consistent with the subject matter of the disclosure on the basis of the principle that the inventor can properly define his own disclosure as the concept of the term to describe it in the best way. It is therefore to be understood that embodiments disclosed herein are merely exemplary and various equivalents or modifications thereof are possible.

Additionally, the terms including expressions "first", "second", etc. are used for merely distinguishing one element from other elements but do not limit the corresponding elements. The above expressions do not limit the sequence and/or importance of the elements.

Further, when it is stated that a certain element is "coupled to" or "connected to" another element, the element may be logically, electrically or physically coupled to or connected to another element. Namely, the element may be directly coupled or connected to another element, or a new element may exist between both elements.

Also, the terms used in describing various embodiments of the disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the disclosure belongs. The terms "include", "comprise", and "have" as well as derivatives thereof, mean inclusion without limitation.

In addition, embodiments within the scope of the disclosure include non-transitory computer-readable media having computer-executable instructions or data structures stored on non-transitory computer-readable media. Such computer-readable media can be any available media that is accessible by a general purpose or special purpose computer system. By way of example, such non-transitory computer-readable media may include, but not limited to, RAM, ROM, EPROM, CD-ROM or other optical disk storage, magnetic disk storage or other magnetic storage devices, or any other physical storage medium that can be used to store or deliver certain program codes formed of non-transitory computer-executable instructions, non-transitory computer-readable instructions or data structures and which can be accessed by a general purpose or special purpose computer system.

In the description and claims, the term "network" or "communication network" is defined as one or more data links that enable electronic data to be transmitted between computer systems and/or modules. When any information is transferred or provided to a computer system via a network or other (wired, wireless, or a combination thereof) communication connection, this connection can be understood as a non-transitory computer-readable medium. The non-transitory computer-readable instructions include, for example, instructions and data that cause a general purpose computer system or special purpose computer system to perform a particular function or group of functions. The computer-executable instructions may be binary, intermediate format instructions, such as, for example, an assembly language, or even source code.

In addition, the disclosure may be implemented in network computing environments having various kinds of computer system configurations such as PCs, laptop computers, handheld devices, multiprocessor systems, microprocessor-based or programmable consumer electronics, network PCs, minicomputers, mainframe computers, mobile phones, PDAs, pagers, and the like.

The disclosure may also be implemented in distributed system environments where both local and remote computer systems linked by a combination of wired data links, wireless data links, or wired and wireless data links through a network perform tasks. In such distributed system environments, program modules may be located in local and remote memory storage devices.

Hereinafter, the disclosure will be described on the assumption that MPEG media transport (MMT) technology is applied. However, this is only an example for convenience of explanation, and the disclosure does not necessarily apply to the MMT technology.

The terms used in the disclosure may be defined as follows.

A content component or a media component is defined as the media of a single type or a subset of the media of a single type, and may be, for example, a video track, movie subtitles, or an enhancement layer of video.

Content is defined as a set of content components, and may be, for example, a movie, a song, and the like.

Hybrid delivery means that two or more content components are transmitted simultaneously through two or more physically different types of networks.

A presentation is defined as an operation performed by one or more devices so that a user can experience one content component or one service (e.g., enjoying a movie).

A service is defined as one or more content components transmitted for presentation or storage.

Service information is defined as metadata describing one service, characteristics of the service, and components of the service.

Non-timed data is defined as all kinds of data elements consumed without specifying time. The non-timed data is data that does not have its own synchronization information for decoding and/or representing its media unit.

Timed data is defined as data elements associated with a particular time for decoding and presentation. The timed data is data having its own synchronization information for decoding and/or representing its media unit.

A media fragment unit (MFU) is a normal container independent of any particular codec and contains encoded media data being consumable independently by a media decoder. The MFU includes one file for media data or non-timed media data being decodable independently by the media decoder together with all or part of an access unit (AU) for timed media data. The MFU contains information which is usable in the transport layer and has a size smaller than or equal to that of the AU.

An MMT entity is an implementation of software or hardware that conforms to an MMT profile.

An MMT packet is a formatted unit of data created or consumed according to an MMT protocol.

An MMT payload is a formatted unit of data that carries a package or signals a message using the MMT protocol or the Internet application layer transport protocol (e.g., a real-time transport protocol (RTP)).

The MMT protocol is an application layer transport protocol for delivering the MMT payload over an IP network.

An MMT payload format is a format for payload of the MMT package or

MMT signaling message to be delivered by the MMT protocol or the Internet application layer protocol (e.g., RTP).

Hereinafter, before describing embodiments of the disclosure, the MMT technology applied to the disclosure will be described in detail with reference to FIGS. 1 and 2.

Figure 2:
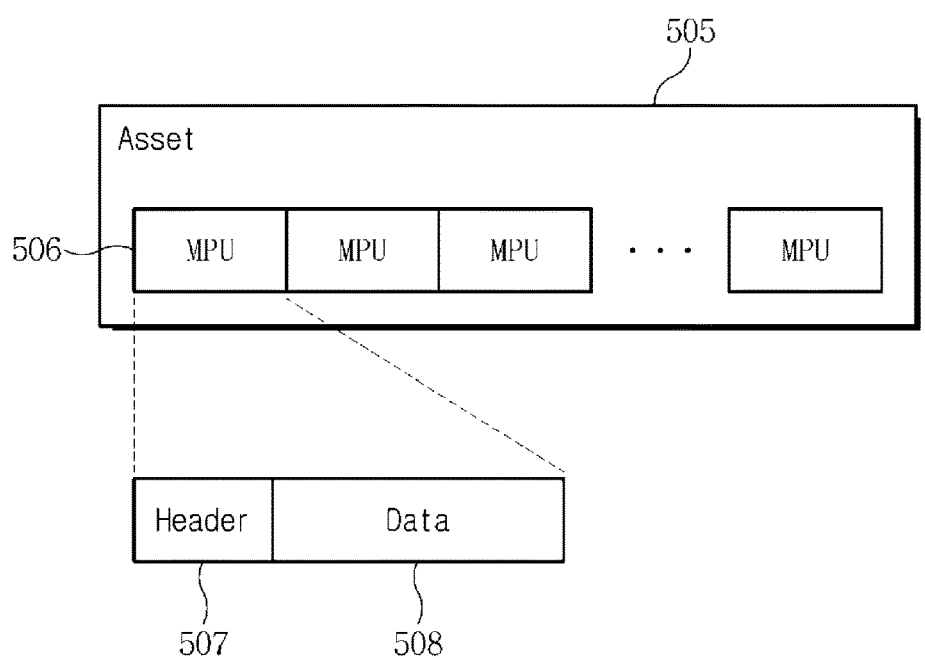

FIGS. 1 and 2 are exemplary diagrams illustrating MMT technology applied to the disclosure.

Referring to FIG. 1, an MMT package 500 is the largest logically structured MMT entity among data models defined in the MMT functional area, and means single independent content such as a movie. A live streaming server that provides a streaming data service may create and provide the MMT package to a terminal. As shown in FIG. 1, the MMT package 500 may be a logically structured collection of several entities. The MMT package 500 may include one or more assets 505, composition information 502, asset delivery characteristics (ADC) 503, and descriptive information, i.e., package information 501.

Among them, the composition information 502 includes information about a relationship, namely, spatial and temporal relations, between the MMT assets 505. If any content is composed of a plurality of MMT packages, the composition information 502 may further include information for indicating a relationship between the MMT packages.

The ADC 503 indicates quality of service (QoS) requirements and statistics for delivery of the asset 505. The plurality of assets 505 may be associated with one ADC 503. In this case, the ADC 503 may be used to set parameters of the MMT payload and the MMT protocol by an entity encapsulating the package for effective delivery of the asset 505. Also, the ADC 503 may include delivery characteristic information needed to determine a delivery condition of the MMT asset 505 or the MMT packet. For example, the ADC 503 may include a traffic description parameter and a QoS descriptor. This delivery characteristic information may be expressed in the form of parameters irrespective of the network environment.

The asset 505, which is the largest logical data unit, refers to a package element that encapsulates encoded media data such as audio, video or webpage data with a timed or non-timed attribute. The asset 505 means a data entity that contains data with the same delivery characteristics. For example, if the MMT package 500 which is the largest entity among data models defined in the MMT functional area refers to single independent content such as a movie, the asset 505 refers to a data unit, such as audio data, video data and script data, for constructing the MMT package 500.

Now, the asset 505 will be described in more detail with reference to FIG. 2. Referring to FIG. 2, the asset 505 may be composed off at least one MPU 506. Here, the MPU 506 refers to a media processing unit (MPU), which is a logical data object. A plurality of MPUs 506 that constitutes one asset 505 has the same asset ID.

In addition, the MPU 506 may be a comprehensive container for timed or non-timed data that is independent of any particular media codec. The MPU 506 may be encoded media data that can be processed completely and independently, and the processing of the MPU may mean encapsulation into a package or packetization for delivery. The MPU 506 may include one or more access units (AUs) for timed data. Here, the AU is the smallest data entity that can have time information. Additionally, the MPU 506 may include data that do not have AU boundaries for non-timed data. The MPU 506, which is a coded media data unit that can be processed completely and independently, may be composed of a header 507 and coded data 508. In addition, the MPU 506 of the disclosure may be further formed of a media fragment unit (MFU).

The MMT package 500 of the disclosure may be applied and operated on an MPU basis. In the following description, the processing is performed in the unit of MPU of MMT streaming data, but the disclosure is not limited thereto. The processing according to the disclosure may be also performed on a MFU basis, depending on system implementation types.

Now, a structure of an overall system for providing streaming data through a node interworking with a base station according to an embodiment of the disclosure will be described.

Figure 3:
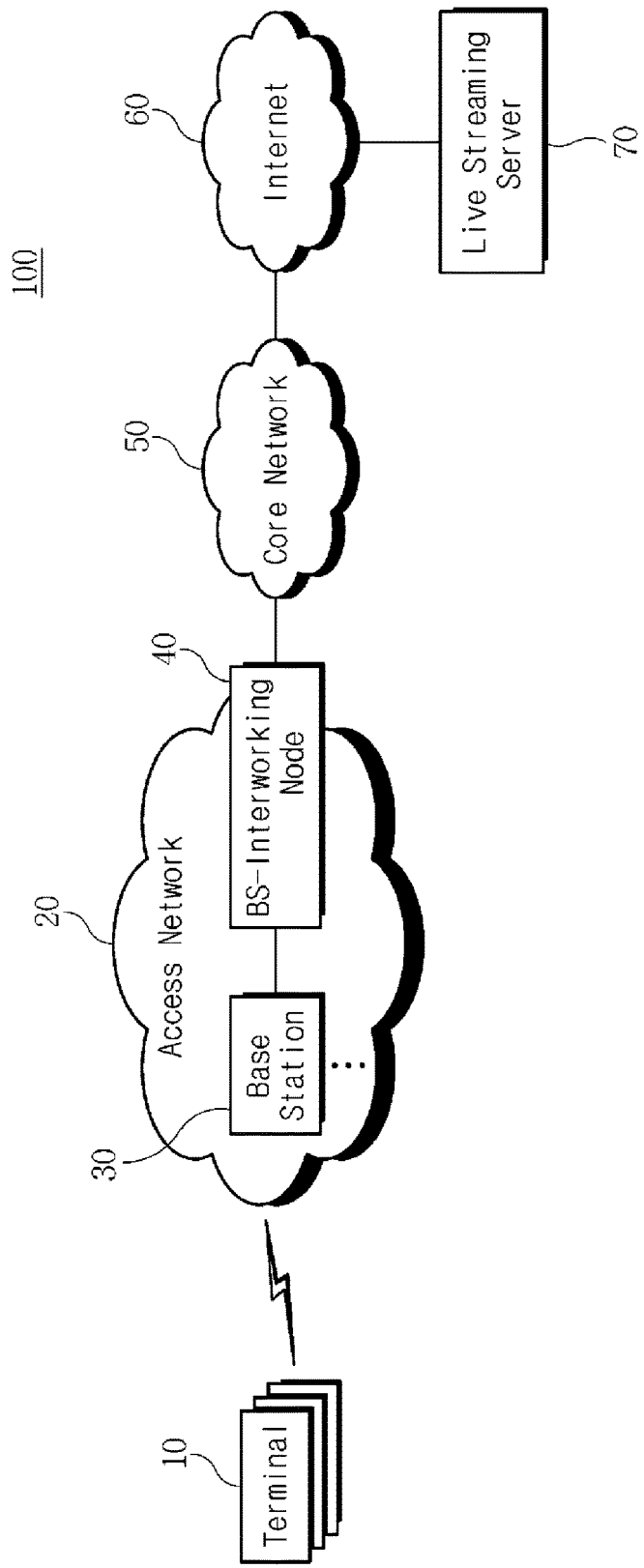
FIG. 3 is a schematic diagram illustrating a system for providing streaming data through a node interworking with a base station according to an embodiment of the disclosure.

FIG. 3 is a schematic diagram illustrating a system for providing streaming data through a node interworking with a base station according to an embodiment of the disclosure.

Referring to FIG. 3, in an embodiment of the disclosure, a system 100 may include a plurality of terminals 10, an access network 20, a core network 50, an Internet 60, and a live streaming server 70. In particular, the system 100 includes a node 40 capable of interworking with at least one base station 30 located in the access network 20.

The terminal 10 refers to a user apparatus capable of transmitting and receiving information to and from the live streaming server 70 via communication networks, i.e., the access network 20, the core network 50 and the Internet 60, by a user's manipulation. The terminal 10 may perform voice or data communication through the access network 20, the core network 50 and the Internet 60. For this, the terminal 10 may include a browser for transmitting and receiving information, a memory for storing a program and a protocol, a microprocessor for executing and controlling various kinds of programs, and the like. In particular, the terminal 10 according to an embodiment of the disclosure may process and play MPEG media transport streaming data (hereinafter, referred to as 'MMT streaming data') delivered from the live streaming server 70.

In embodiments of the disclosure, the terminal 10 may be implemented in various forms. For example, the terminal 10 may be a mobile device such as a smart phone, a tablet personal computer (tablet PC), a personal digital assistant (PDA), a portable multimedia player (PMP), an MP3 player, and the like, or a stationary device such as a smart TV, a desktop computer, and the like.

According to a recent trend of convergence in digital devices, a great variety of mobile devices or their equivalences may be used as the terminal 10. In particular, any device capable of receiving MMT streaming data from the live streaming server 70 via the access network 20, the core network 50 and the Internet 60 and then processing the MMT streaming data may be used as the terminal 10 according to an embodiment of the disclosure.

The access network 20 is to support the access of the terminal 10 to the core network 50 in accordance with wired/wireless communication schemes. The access network 20 includes a plurality of base stations (BSs) 30, also referred to as a base transceiver station (BTS), Node B, or evolved Node B (eNB), and controllers referred to as a base station controller (BSC) or a radio network controller (RNC). In addition, a digital signal processor and a radio signal processor, which are normally implemented with the base station 30, may be separated as a digital unit (DU) and a radio unit (RU). Then a plurality of RUs may be disposed respectively at a plurality of regions and connected to a centralized DU.

The core network 50 which forms the communication network together with the access network 20 performs a function to connect the access network 20 to an external network such as the Internet 60.

The core network 50 performs circuit switching or packet switching and also manages and controls a packet flow in the access network 20. Additionally, the core network 50 may manage mobility between frequencies, control traffic therein and in the access network 20, and control interworking with other network such as the Internet 60. The core network 50 may include a serving gateway (SGW), a packet data network (PDN) gateway (PGW), a mobile switching center (MSC), a home location register (HLR), a mobile mobility entity (MME), a home subscriber server (HSS), and/or the like.

Meanwhile, the Internet 60 is a public communication network in which information is exchanged according to the TCP/IP protocol. The Internet 60 is connected to the live streaming server 70 and supports MMT streaming data, received from the live streaming server 70, to be delivered to the terminal 10 through the core network 50 and the access network 20. On the other hand, the terminal 10 may transmit various commands for receiving MMT streaming data to the live streaming server 70 via the access network 20, the core network 50, and the Internet 60. The disclosure is, however, not limited thereto, and the live streaming server 70 may be located in the core network 50 and can be operated by the same operator as or different operator from that of the core network 50.

Although it is exemplarily described that the network of the disclosure is implemented as the access network 20, the core network 50 and the Internet 60, the disclosure is not limited thereto. Alternatively, any other widely-known or later-developed communication schemes may be further or alternatively applied to the disclosure.

The live streaming server 70 delivers the MMT streaming data to the terminal 10 at the request of the terminal 10. As discussed above, the MMT streaming data refers to streaming data that can be delivered to the terminal 10 in the form of an MMT packet. The live streaming server 70 may provide, for example, a broadcast service to the terminal 10 in accordance with an MMT streaming data format.

In addition, although not shown in the drawings, the system 100 of the disclosure may further include a content providing server (not shown in the drawings). In this case, the live streaming server 70 may convert data, delivered from the content providing server, into the MMT streaming data and then transmit the MMT streaming data to the terminal 10.

In an embodiment of the disclosure, the system 100 includes the node 40 that interworks with at least one base station (BS) 30. Namely, the node 40 may be referred to as a BS-interworking node.

The BS-interworking node 40 is located between the access network 20 and the core network 50, monitors various packets transmitted and received between the access network 20 and the core network 50, and performs a suitable control operation. In particular, the BS-interworking node 40 monitors the streaming data delivered from the live streaming server 70 to the terminal 10. Here, the streaming data means MPEG media transport (MMT) streaming data. The BS-interworking node 40 may analyze streaming data composed of at least one media processing unit (MPU) in units of MPU and thereby determine whether predetermined event information is contained. If any MPU that contains the predetermined event information exists in the streaming data, the BS-interworking node 40 changes the corresponding MPU to a predetermined event unit. Here, the predetermined event unit may be additional service information such as an advertisement.

The BS-interworking node 40 may collect user information about the terminal 10 connected to the base station 30 by interlocking with the base station 30, select an event unit customized for each user information, and then switch to the selected event unit. At this time, the BS-interworking node 40 may further interwork with a home subscriber server (not shown in the drawings) or the like located in the core network 50 when collecting the user information.

Additionally, in order to replace the MPU, where predetermined information occurs, with a predetermined event unit, the BS-interworking node 40 may interrupt transmission of the corresponding MPU to the terminal 10. At this time, even though interrupting the MPU transmission, the BS-interworking node 40 may continuously analyze the MPUs delivered from the live streaming server 70 so as to determines whether event release information is contained.

The event unit replaced by the BS-interworking node 40 may also be a unit in accordance with the MPU standard. Thus, the BS-interworking node 40 may replace some of the MPUs units with predetermined event units in the streaming data provided by the live streaming server 70. In addition, the terminal 10 may receive and play seamless streaming data and also play various additional information provided by the BS-interworking node 40 during streaming data playback.

Main elements and detailed operations of the terminal 10, the BS-interworking node 40, and the live streaming server 70 will be described later. A processor embedded in each apparatus according an embodiment of the disclosure may process a program command for executing the method of the disclosure. This processor may be a single-threaded processor in one implementation or a multi-threaded processor in another implementation. Further, this processor may process commands stored in a memory or any other storage.

Now, main elements and operating method of the terminal 10 according to an embodiment of the disclosure will be described.

Figure 4:
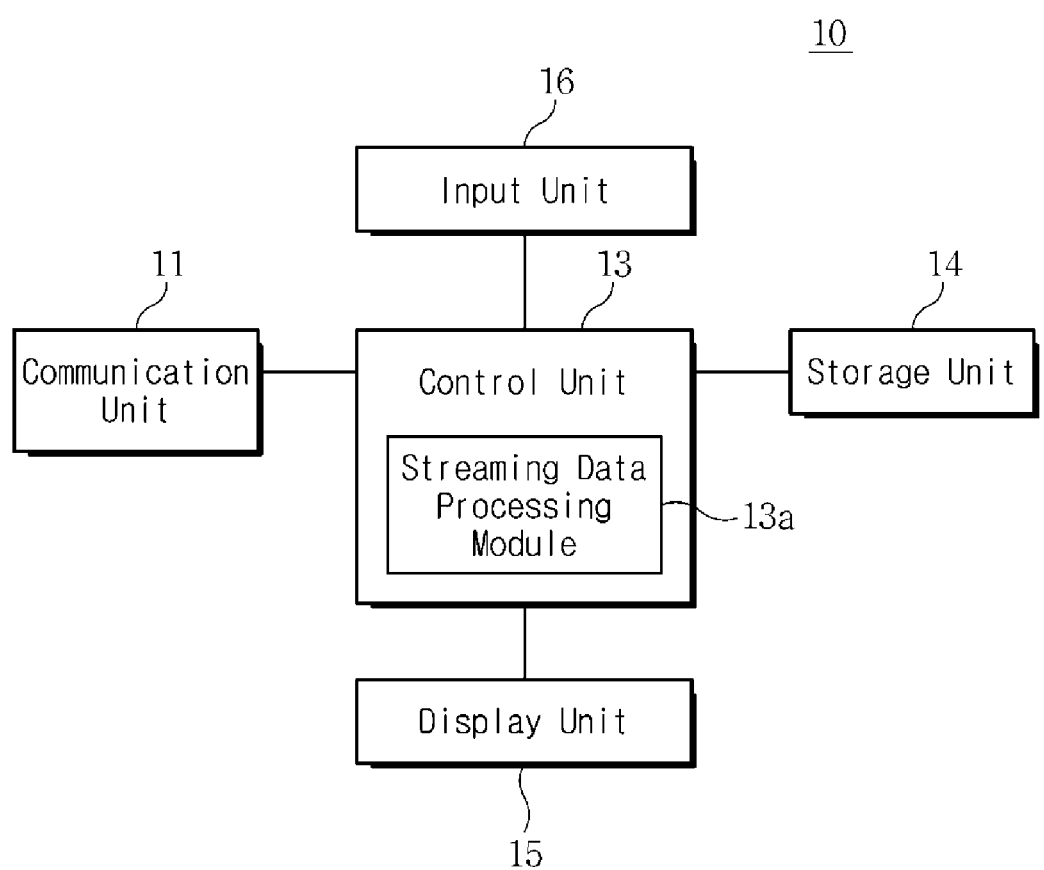
FIG. 4 is a block diagram illustrating main elements of a terminal according to an embodiment of the disclosure.

FIG. 4 is a block diagram illustrating main elements of a terminal according to an embodiment of the disclosure.

Referring to FIGS. 3 and 4, in an embodiment of the disclosure, the terminal 10 may include a communication unit 11, an input unit 12, a control unit 13, a storage unit 14, and a display unit 15.

The communication unit 11 may support a process of connecting to the neighboring access network 20 for an access to the core network 50. For example, the communication unit 11 may be connected to the access network 20 through a process of discovering the base station 30 located within a predetermined coverage, requesting an access to the discovered base station 30, and accessing to the base station 30. Since this process is well known, a detailed description will be omitted. In addition, when performing a communication procedure with the base station 30, the communication unit 11 may transmit user information to the base station 30. Basically, terminal identification information such as an international mobile subscriber identity (IMSI) may be transmitted to the base station 30. Therefore, while performing an access procedure with the core network 50, the base station 30 may identify subscriber information by using the terminal identification information.

Additionally, when successfully accessing the core network 50 through the base station 30 of the core network 20, the communication unit 11 sends a request for MMT streaming data transmission to the live streaming server 70 via the Internet 60 and delivers received MMT streaming data to the control unit 13.

The input unit 12 creates an input signal associated with various kinds of information for setting or controlling a function of the terminal 10 in response to a user's manipulation and then delivers the input signal to the control unit 13. In particular, the input unit 12 may create and deliver a user input for requesting MMT streaming data transmission. For example, the input unit 12 may receive a user's input for executing a particular application for playback of MMT streaming data and also receive a user's input for selecting a specific channel through the executed application.

The input unit 12 may include a key input tool such as a keyboard or a keypad, a touch input tool such as a touch sensor or a touch pad, a voice input tool, and a gesture input tool having at least one of a gyro sensor, a geomagnetic sensor, an acceleration sensor, a proximity sensor, and a camera.

Besides, all kinds of input tools being developed or to be developed may be included.

The control unit 13 performs the overall control of the terminal 10. In view of hardware, the control unit 13 may be configured to include at least one processor such as a central processing unit (CPU) and a micro processing unit (MPU), at least one execution memory (e.g., a register and/or a random access memory (RAM)) onto which data is loaded, and a bus for inputting or outputting data to or from the processor and the memory. In view of software, the control unit 13 may be configured to include a program routine or program data loaded onto the execution memory from a recording medium and then processed by the processor so as to perform a function defined in the terminal 10. Namely, any processable function in view of software among functions of the terminal 10 so as to request and receive MMT streaming data to and from the live streaming server 70 and process the MMT streaming data may be considered as a function of the control unit 13.

The control unit 13 of the disclosure is functionally connected with one or more elements equipped for streaming data processing according to an embodiment of the disclosure. Namely, the control unit 13 is functionally connected with the communication unit 11, the input unit 12, the storage unit 14, and the display unit 15, and controls the supply of power to each element and the flow of signals for performing functions.

In particular, the control unit 13 according to an embodiment of the disclosure may include a streaming data processing module 13*a* that supports an MPEG-2 TS processing function capable of processing the MMT streaming data. For example, the streaming data processing module 13*a* may receive MMT streaming data composed of a plurality of MPUs delivered from the live streaming server 70 and, if the streaming data is formed of a plurality of assets, may output the assets synchronized according to time information. In addition, the streaming data processing module 13*a* may process functions for performing various operations defined by the MMT protocol.

The storage unit 14 may temporarily store application programs required for the operation of functions according to an embodiment of the disclosure and various data created during the execution of the application programs. Particularly, the storage unit 14 may store various commands for processing MMT streaming data.

The storage unit 14 may include mainly a program region and a data region. The program region stores related information for the operation of the terminal 10, such as an operating system (OS) for booting the terminal 10. The data region stores data created by the use of the terminal 10, and may store various commands for processing streaming data as mentioned above. The storage unit 14 may be formed of storage media such a flash memory, a hard disk, a multimedia card micro type memory (e.g., SD or XD memory, etc.), RAM, and ROM.

The display unit 15 may display information about an operating status and an operating result produced during the execution of functions of the terminal 10. Particularly, the display unit 15 of the disclosure may display information created by playing streaming data received from the live streaming server 70.

The display unit 15 may be implemented in the form of a single touch panel (or touch screen) together with the input unit 12. In this case, the display unit 15 may display various kinds of information produced according to user's touch action.

Additionally, the display unit 15 may be formed of a liquid crystal display (LCD), a thin film transistor LCD (TFT-LCD), an organic light emitting diodes (OLED), an LED, an active matrix organic LED (AMOLED), a flexible display, a 3-dimensional display, or the like. Some of them may have a transparent or light-penetrate form through which the outside can be seen. This may be configured in the form of a transparent display including a transparent OLED (TOLED).

Hereinbefore, main elements of the terminal 10 are described through FIG. 4. The elements shown in FIG. 4 are, however, not always essential, and more or less elements than shown may be used for the terminal 10. For example, the terminal 10 may further include an audio output unit (not shown in the drawings) for converting an electric audio signal into an analog signal and then outputting the signal. This audio output unit (not shown in the drawings) may perform a function of supporting the output of various kinds of information associated with playback of the MMT streaming data delivered from the live streaming server 70.

Additionally, the main elements of the terminal 10 shown in FIG. 4 may be varied in position for convenience or any other reason. Although only the streaming data processing module 13a is shown as modules for constituting the control unit 13, the disclosure is not limited to that. The control unit 13 may be formed of various modules for performing various functions.

Now, main elements and operating method of the BS-interworking node 40 according to an embodiment of the disclosure will be described.

Figure 5:
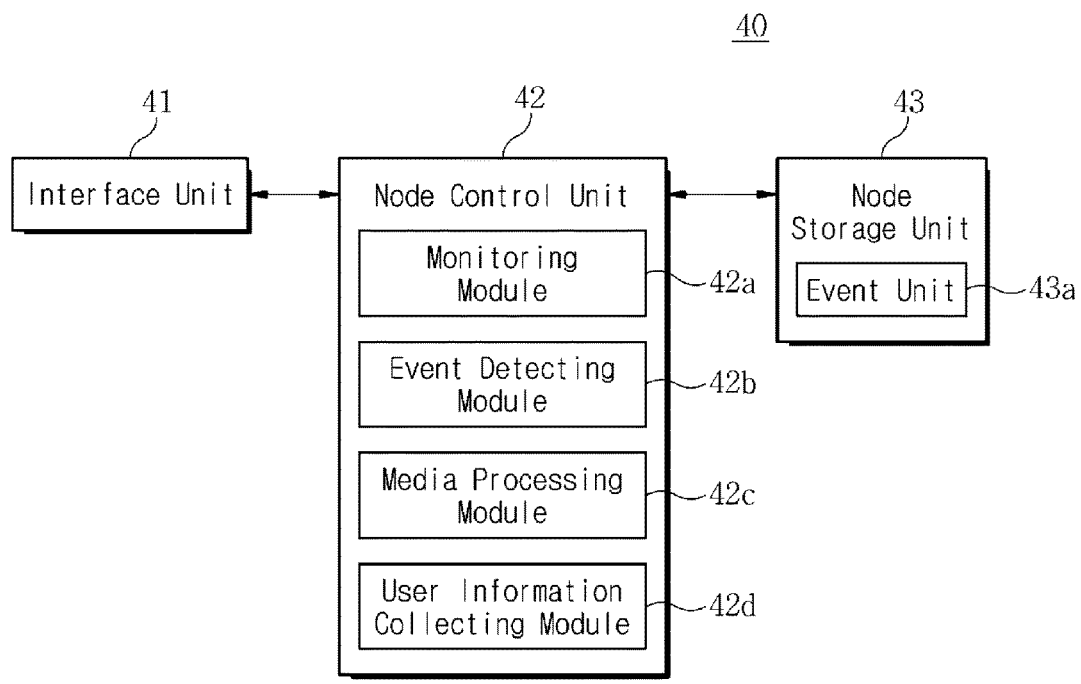
FIG. 5 is a block diagram illustrating main elements of a node interworking with a base station according to an embodiment of the disclosure.

FIG. 5 is a block diagram illustrating main elements of a node interworking with a base station according to an embodiment of the disclosure.

Referring to FIGS. 3 and 5, in an embodiment of the disclosure, the BS-interworking node 40 may include an interface unit 41, a node control unit 42, and a node storage unit 43.

The interface unit 41 supports transmission and reception of information. In particular, the interface unit 41 transmits and receives information to and from a manager apparatus (not shown in the drawings), and deliver received various kinds of information for processing the streaming data providing method of the disclosure to the node control unit 42. For example, the interface unit 41 may receive information about an event unit from the manager apparatus (not shown in the drawings). Also, the interface unit 41 may transmit response information to the manager apparatus (not shown in the drawings). Here, the manager apparatus (not shown in the drawings) may be the live streaming server 70 or a separate server an operator of which is different from that of the live streaming server 70.

While being connected to at least one base station 30, the interface unit 41 may collect access information about the terminal 10 connected to the base station 30 from the base station 30 and then deliver the collected access information to the node control unit 42. Also, the interface unit 41 may receive user information about the terminal 10 connected to the base station 30 from a home subscriber unit (not shown in the drawings) located in the core network 50 and may transmit the user information to the node control unit 42.

In addition, the interface unit 41 located between the base station 30 of the access network 20 and the core network 50 may collect streaming data, delivered from the live streaming providing server 70 to the terminal 10, and then transmit the collected streaming data to the node control unit 42. Also, under the control of the node control unit 42, the interface unit 41 may control the streaming data, some MPUs of which are changed to predetermined event units, to be delivered to the terminal 10.

The node control unit 42 performs the overall control of the BS-interworking node 40. The node control unit 42 may include a monitoring module 42a, an event detecting module 42b, a media processing module 42c, and a user information collecting module 42d.

The monitoring module 42a monitors MMT streaming data delivered from the live streaming server 70 to the terminal 10 by receiving the MMT streaming data through the interface unit 41. At this time, the monitoring module 42a delivers the MMT streaming data, as being provided by the live streaming server 70, to the terminal 10 without blocking it, and may also support the event detecting module 42b to determine whether predetermined event information is contained in the MMT streaming data.

The event detecting module 42b may analyze whether there is predetermined event information in the MMT streaming data being monitored through the monitoring module 42a. The event detecting module 42b may perform this determination as follows.

For example, the event detecting module 42b may receive predetermined event signaling which is additionally created separately from the streaming data delivered from the live streaming server 70. In another embodiment, if there is an MPU designated for event signaling among MPUs of the MMT streaming data, the event detecting module 42b may determine that the predetermined event information is contained. Here, the MPU designated for event signaling may be specific information additionally inserted by the live streaming server 70.

According to still another embodiment, the event detecting module 42b may analyze header or data information in each MPU of the MMT streaming data and thereby determine whether predetermined information is contained. Since each MPU includes the header 507 and the data 508 as shown in FIG. 2, the event detecting module 42b may check metadata of information in the header 507 and thereby determine whether the predetermined information is contained. In addition, the event detecting module 42b may analyze the data 508. If the MPU is composed of video data, the event detecting module 42b may analyze in an image processing manner whether the MPU contains a predefined watermark (e.g., "Now the commercial will start."). Also, if the MPU is composed of caption data, the event detecting module 42b may check the script of the caption data and analyze whether a predetermined caption is contained.

In addition, if the MPU is composed of data for signaling, the event detecting module 42b may analyze whether the signaling data includes signaling information such as a manager's stop command.

In these ways, the event detecting module 42b may determine whether the predetermined event information is contained in each MPU. If a certain MPU has the predetermined event information, the event detecting module 42b notifies the event information to the media processing module 42c.

In addition, if the predetermined event information is contained in a specific MPU, the event detecting module 42b may continuously check subsequent MPUs delivered thereafter to detect whether event release information is contained. This process of detecting the event release information may be performed in a manner similar to the above-discussed process of detecting the information. If it is determined that the specific MPU has predetermined event release information, the event detecting module 42b may notify this to the media processing module 42c.

When the event detecting module 42b detects the predetermined event information from a specific MPU, the media processing module 42c may replace the specific MPU and the subsequent MPUs with predetermined event units while continuously delivering the MMT streaming data having such event units the terminal 10. Here, the predetermined event unit may include advertisement information.

At this time, the media processing module 42c selects and extracts an appropriate event unit in consideration of the user information collected by the user information collecting module 42d, and replaces specific MPUs with the extracted event unit. For example, if the user of the terminal 10 is '20s' and 'female', the user information collecting module 42d may collect and manage this user information regarding the terminal 10 in advance. Also, considering such user information collected by the user information collecting module 42d, the media processing module 42c selects and extracts a predetermined event unit previously stored to correspond to the user information. For selecting the event unit, the media processing module 42c may further consider various factors such as current time information, location information of the base station, and the like.

In addition, the media processing module 42c may identify a block size of the MPU by referring to header information of the MPU. When the MPU is replaced with a predetermined event unit, the media processing module 42c may adjust a block size of the predetermined event unit so that the predetermined event replaces the MPU to fit the block size.

Figure 9A:
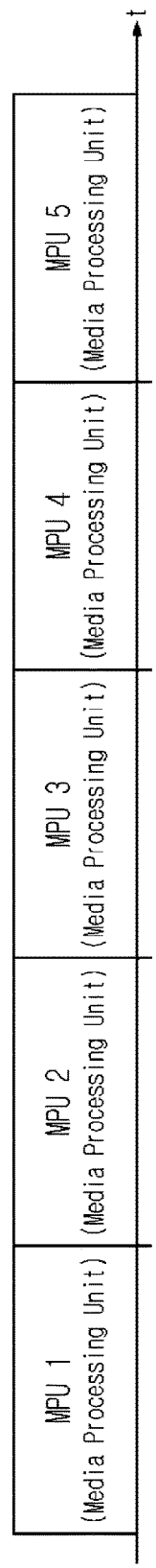
FIG. 9A and FIG. 9B are exemplary diagrams illustrating a method for providing streaming data through a node interworking with a base station according to an embodiment of the disclosure.
Figure 9B:
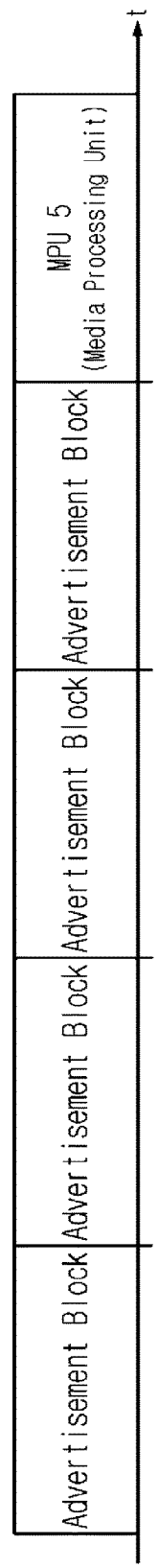

Referring to FIG. 9A and FIG. 9B, suppose that MMT streaming data composed of a plurality of MPUs such as MPU 1, MPU 2, MPU 3, MPU 4 and MPU 5 is sequentially delivered to the terminal 10 as shown in FIG. 9A. In this case, if the event detecting module 42b detects predetermined event information from the MPU 1, the media processing module 42c may replace the corresponding MPU and the subsequent MPUs, i.e., the respective MPUs from the MPU1, with a predetermined event unit, e.g., an advertisement block. Therefore, the respective MPUs from the MPU 1 before replaced may not be delivered to the terminal 10.

Even though the MPUs replaced by the media processing module 42c are blocked from being delivered to the terminal 10, the event detecting module 42b may continuously check the MPUs delivered from the live streaming server 70 to detect event release information. For example, if the MPU 5 has event release information, the event detecting module 42b may notify this to the media processing module 42c. Then the media processing module 42c may bypass the MPU 5 and the subsequent MPUs to be delivered to the terminal 10 as they are.

The user information collecting module 42d collects user information of the terminal 10 connected to the base station 30 as described above. At this time, the user information collecting module 42d may collect, as user information, subscriber information of the terminal 10 connected to the base station 30 by interworking with a home subscriber apparatus (not shown in the drawings) located in the core network 50. The user information collecting module 42d may support a process of storing the collected user information in the node storage unit 43 to correspond to an identification number of the terminal 10 and may also support a process of delivering the stored user information to the media processing module 42c at the request of the media processing module 42c. If a connection between the terminal 10 and the base station 30 is terminated, the user information collecting module 42d may delete the stored user information corresponding to the terminal 10. Also, the user information collecting module 42d may further collect information about the base station 30.

The node storage unit 43 may store and manage necessary information according to an embodiment of the disclosure. In particular, the node storage unit 43 may store and manage an event unit 43a. Here, the event unit 43a refers to information being addable by a manager and may includes, for example, advertisement information.

In addition, there may be a plurality of event units 43a, which may be stored corresponding to setting information. For example, suppose that there are two event units A and B. Also, suppose that the event unit A is set to "20s, female, base station A, and transmission from 12 to 2 o'clock", and the event unit B is set to "30s, male, base station A, and transmission from 12 to 2 o'clock". In this example, when the MPU is replaced, the media processing module 42c may selectively extract the event unit according to such setting information. If the terminal 10 that is connected to the base station A at 1:00 and currently receives MMT streaming data from the live streaming server 70 has user information of "20s, female", the media processing module 42c may select and extract the event unit A from among two event units and replace the MPUs with the extracted event unit A so that the terminal 10 can receive and play the event unit A.

In addition, the node storage unit 43 may further store and manage user information, base station information, and the like.

Heretofore, the BS-interworking node 40 according to an embodiment of the disclosure is described.

Now, main elements and operating method of the liver streaming server 70 according to an embodiment of the disclosure will be described.

Figure 6:
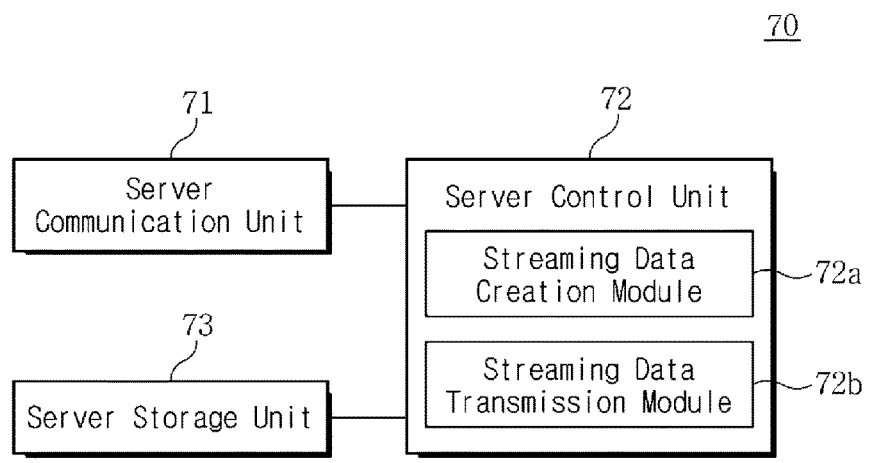
FIG. 6 is a block diagram illustrating main elements of a live streaming server according to an embodiment of the disclosure.

FIG. 6 is a block diagram illustrating main elements of a live streaming server according to an embodiment of the disclosure.

Referring to FIGS. 3 and 6, in an embodiment of the disclosure, the live streaming server 70 may include a server communication unit 71, a server control unit 72, and a server storage unit 73.

The server communication unit 71 supports transmission and reception of information with the terminal 10. For example, the server communication unit 71 may receive a request for transmission of MMT streaming data from the terminal 10 and transmit the MMT streaming data to the terminal 10. The MMT streaming data may be composed of one or more assets, each of which may be composed of a plurality of MPUs. The server communication unit 71 may sequentially deliver a plurality of assets each having a plurality of MPUs to the terminal 10 through one channel in a streaming manner. When the server communication unit 71 transmits and receives information to and from the content providing server (not shown in the drawings), the server communication unit 71 may transmit a request for specific content to the content providing server (not shown in the drawings) and receive the requested content from the content providing server (not shown in the drawings).

The server control unit 72 is configured to perform overall control of the live streaming server 70 according to an embodiment of the disclosure and may include a streaming data creation module 72a and a streaming data transmission module 72b.

The streaming data creation module 72a may create MMT streaming data. For example, the streaming data creation module 72a may convert content delivered from the content providing server (not shown in the drawings) into a streaming data form that meets the MMT protocol. Namely, the streaming data creation module 72a may determine a block size of the MPU and, based on the determined block size, construct each MPU to create the MMT streaming data.

Also, the streaming data creation module 72a may insert playback time information into each MPU and perform a necessary process so that the terminal 10 synchronizes and plays such MPUs according to the playback time information.

In addition, the streaming data transmission module 72b may transmit the MMT streaming data to the terminal 10 that requests the MMT streaming data. At this time, if the MMT streaming data requested by the terminal 10 includes a plurality of assets each having a plurality of MPUs, the streaming data transmission module 72b may control such MPUs to be sequentially delivered to the terminal 10.

In addition, the server control unit 72 may store and manage information about the terminal 10 that requests the MMT streaming data. If the terminal 10 requests the MMT streaming data, the server control unit 72 may check whether the terminal 10 is subscribed to a live streaming service provided by the live streaming server 70, and provide the MMT streaming data to the terminal 10 only subscribed to the live streaming service.

The server storage unit 73 may store and manage various kinds of information necessary for the operation of the live streaming server 70 according to an embodiment of the disclosure.

Heretofore, the live streaming server 70 according to an embodiment is described.

In view of hardware, the live streaming server 70 according to an embodiment of the disclosure has the same configuration as a typical web server or network server. However, in view of software, the live streaming server 70 includes a program module implemented by means of computer languages such as C, C++, Java, Visual Basic, Visual C, and the like.

Meanwhile, the memory or storage unit equipped in each apparatus of the disclosure stores information therein. In one embodiment, the memory or storage unit is a non-transitory computer-readable medium. The memory or storage unit may be a volatile memory unit in one embodiment and may be a nonvolatile memory unit in another embodiment. In various embodiments, the memory or storage unit may include, for example, a hard disk device, an optical disk device, or any other high-volume storage device.

In addition, the term "module" used herein may refer to a component or device which is formed of software, hardware, or combination thereof, and performs certain tasks. The module may include, for example, components, such as software components, object-oriented software components, class components and task components, processes, functions, attributes, procedures, subroutines, segments of program code, drivers, data, databases, data structures, tables, arrays, and variables. The functionality provided for in the components and modules may be combined into fewer components and modules or further separated into additional components and modules.

Although this description and drawings illustrate exemplary device elements, the subject matters and functional operations disclosed herein may be implemented by different type digital electronic circuits or implemented by computer software, firmware or hardware including a structure disclosed herein and structural equivalent thereof, or any combination thereof. The subject matters disclosed herein may be implemented by at least one computer program product, namely at least one module regarding computer program commands encoded on a program storage medium so as to control the operation of a device according to the disclosure or allow execution thereby. A non-transitory computer-readable medium may be a machine-readable storage device, a machine-readable storage board, a memory device, a machine-readable composition of material affecting wave-type signaling, or a combination thereof.

Now, a streaming data providing method through the BS-interworking node according to an embodiment of the disclosure will be described.

Figure 7:
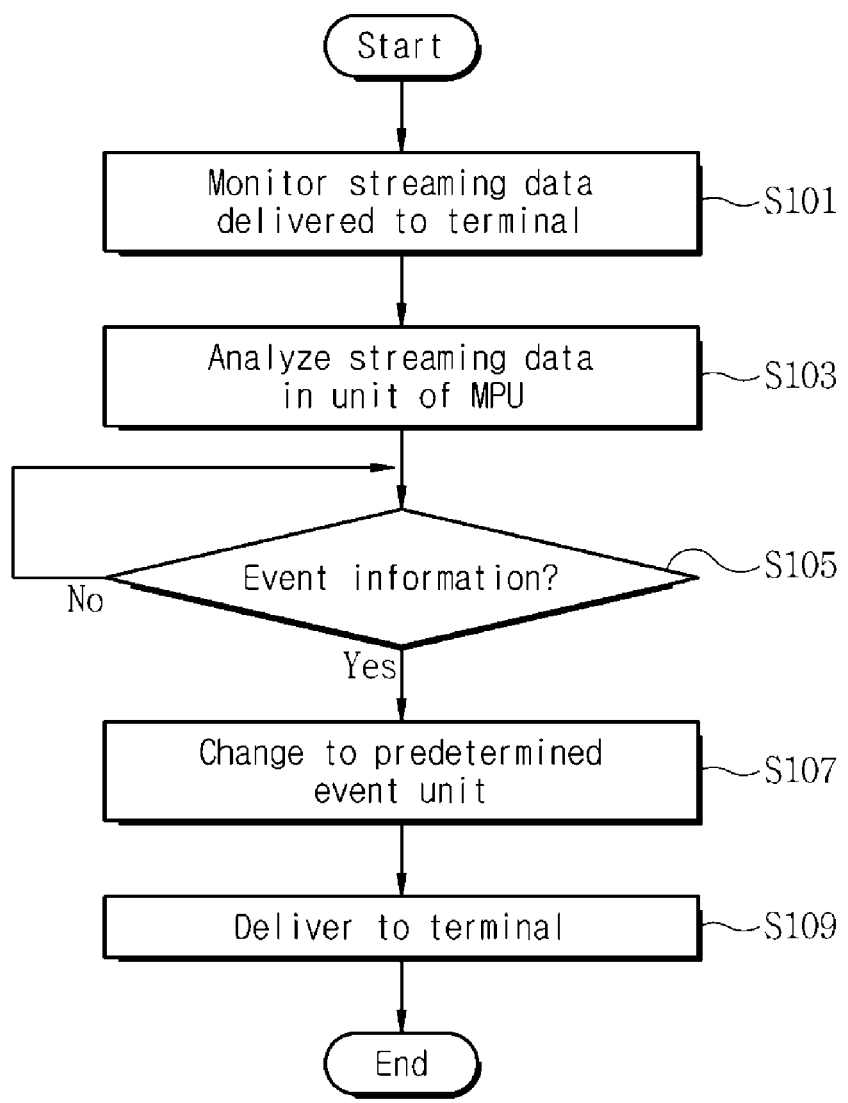
FIG. 7 is a flow diagram illustrating a method for providing streaming data through a node interworking with a base station according to an embodiment of the disclosure.

FIG. 7 is a flow diagram illustrating a method for providing streaming data through a node interworking with a base station according to an embodiment of the disclosure.

At the outset, the terminal 10 is in a state of being connected to the base station (BS) 30 of the specific access network 20 and receiving MMT streaming data from the live streaming server 70 via the base station 30. In addition, the BS-interworking node 40 is connected to the base station 30.

Referring to FIGS. 3 and 7, in this state, the BS-interworking node 40 may monitor the MMT streaming data delivered from the live streaming server 70 to the terminal 10 (step S101).

Then the BS-interworking node 40 analyzes the MMT streaming data delivered to the terminal 10 in units of MPU (step S103), and thereby determine whether there is predetermined event information (step S105).

If it is determined that the predetermined event information is contained in a specific MPU, the BS-interworking node 40 changes the specific MPU and the subsequent MPUs to a predetermined event unit (step S107) and then delivers the event unit to the terminal 10 (step S109). Namely, the BS-interworking node 40 may block the MPUs, being delivered from the live streaming server 70 to the terminal 10, and enable the terminal 10 to receive the predetermined event unit instead of the MPUs.

This process will be described in more detail with reference to FIG. 8.

Figure 8:
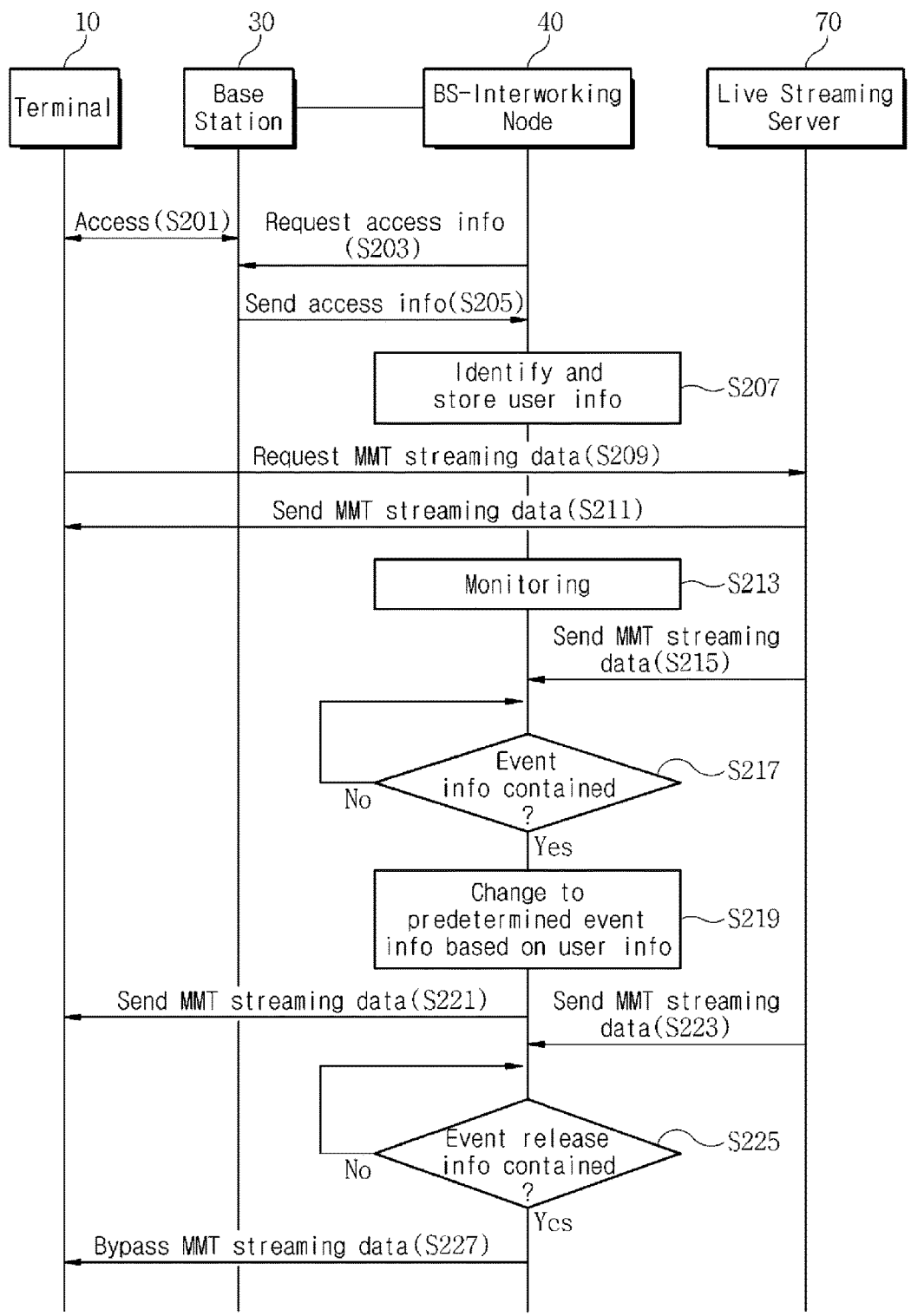
FIG. 8 is a flow diagram further illustrating a method for providing streaming data through a node interworking with a base station according to an embodiment of the disclosure.

FIG. 8 is a flow diagram further illustrating a method for providing streaming data through a node interworking with a base station according to an embodiment of the disclosure.

Referring to FIG. 8, the terminal 10 is placed in a state of being connected to any one of the base stations 30 (step S201). Here, the terminal 10 may be connected to any one of the base stations 30 in accordance with various known techniques. In addition, the BS-interworking node 40 is placed in a state of being connected to the base station 30. The number of base stations 30 being connectable to the BS-interworking node 40 may be one or more. In this state, the BS-interworking node 40 periodically transmits a request for access information about the terminal 10 to the base station 30 and then collects and stores the access information (steps S203 to S207). Namely, the BS-interworking node 40 may request and receive information about the currently accessed terminal 10 to and from the connected base station 30. For example, the BS-interworking node 40 may receive identification information of the terminal 10 connected to the base station 30. Additionally, the BS-interworking node 40 may request and receive user information corresponding to the identification information of the terminal 10 from an additional apparatus such as a home subscriber server (not shown in the drawings) or a big data server (not shown in the drawings) located in the core network 50. In addition, if the BS-interworking node 40 is connected to a plurality of base stations 30, the BS-interworking node 40 may further collect and manage information about the base station 30 itself.

In this state, if the terminal 10 requests the MMT streaming data to the live streaming server 70 (step S209), the live streaming server 70 sequentially transmits the MMT streaming data requested by the terminal 10 to the terminal 10 in a streaming manner (step S211).

Further, the BS-interworking node 40 connected to the base station 30 monitors information transmitted and received between the terminal 10 and the live streaming server 70 (step S213), and thereby determines whether there is predetermined event information in the MMT streaming data delivered from the live streaming server 70 to the terminal 10 (steps 215 and 217). Here, the BS-interworking node 40 may determine whether there is the predetermined event information, as follows.

In one embodiment, when predetermined event signaling is received from the live streaming server 70, the BS-interworking node 40 may determine that the predetermined event information is contained in the corresponding MPU.

In another embodiment, the BS-interworking node 40 may determine whether there is any MPU designated for event signaling among each MPU of the MMT streaming data being delivered sequentially. Here, the MPU designated for event signaling may be specific information additionally inserted by the live streaming server 70.

In still another embodiment, the BS-interworking node 40 may analyze header or data information in each MPU of the MMT streaming data and thereby determine whether predetermined information is contained. Since each MPU includes the header 507 and the data 508 as shown in FIG. 2, the BS-interworking node 40 may check metadata of information in the header 507 and thereby determine whether the predetermined information is contained. In addition, the BS-interworking node 40 may analyze the data 508. If the MPU is composed of video data, the BS-interworking node 40 may analyze in an image processing manner whether the MPU contains a predefined watermark (e.g., "Now the commercial will start."). Also, if the MPU is composed of caption data, the BS-interworking node 40 may check the script of the caption data and analyze whether a predetermined caption is contained.

In addition, if the MPU is composed of data for signaling, the BS-interworking node 40 may analyze whether the signaling data includes signaling information such as a manager's stop command.

Through this process, the BS-interworking node 40 may determine whether the predetermined event information is contained in each MPU. If a certain MPU has the predetermined event information, the BS-interworking node 40 may block MPUs from the corresponding MPU so as not to be delivered to the terminal 10 and then replace such MPUs with the predetermined event unit (step S219). Also, the BS-interworking node 40 delivers the MMT streaming data including the replaced event unit to the terminal 10 (step S221).

At this time, the BS-interworking node 40 selects and extracts an appropriate event unit in consideration of the user information collected in advance at step S207, and replaces the corresponding MPU and the subsequent MPUs with the extracted event unit. For example, if the user of the terminal 10 is '20s' and 'female', the BS-interworking node 40 replaces MPUs, having corresponding event information of the MMT streaming data delivered to the terminal 10, with the event unit stored in advance to correspond to the user information of '20s' and 'female'. For selecting the optimum event unit, the BS-interworking node 40 may further consider various factors such as current time information, location information of the base station, and the like.

In addition, the BS-interworking node 40 may identify a block size of the MPU by referring to header information of the MPU. When the MPU is replaced with a predetermined event unit, the BS-interworking node 40 may adjust a block size of the predetermined event unit so that the predetermined event replaces the MPU to fit the block size.

Further, while controlling the MMT streaming data having the replaced event unit to be continuously delivered to the terminal 10, the BS-interworking node 40 may monitor the MMT streaming data being continuously delivered from the live streaming 70 to the terminal 10 (step S223), and thereby may continuously determine whether the MMT streaming data contains predetermined event release information (step S225). Here, a process of analyzing whether the event release information is contained may be performed in a manner similar to the above-discussed process of analyzing whether the event information is contained.

If it is determined that the predetermined event release information is contained, the BS-interworking node 40 may bypass the MMT streaming data so that the terminal 10 receives the MPUs as they are delivered from the live streaming server 70 (step S227).

As earlier described with reference to FIG. 9A and FIG. 9B, if predetermined event information is detected from the MPU 1 in a state where the MMT streaming data composed of a plurality of MPUs such as MPU 1, MPU 2, MPU 3, MPU 4 and MPU 5 is sequentially delivered to the terminal 10 as shown in FIG. 9A, the BS-interworking node 40 may replace the corresponding MPU and the subsequent MPUs, i.e., the respective MPUs from the MPU1, with a predetermined event unit, e.g., an advertisement block. Therefore, the respective MPUs from the MPU 1 before replaced may not be delivered to the terminal 10.

Even though the replaced MPUs are blocked from being delivered to the terminal 10, the BS-interworking node 40 may continuously check the MPUs to detect event release information. For example, if the MPU 5 has event release information, the BS-interworking node 40 may bypass the MPU 5 and the subsequent MPUs to be delivered to the terminal 10 as they are.

Heretofore, the streaming data providing method through the BS-interworking node according to an embodiment of the disclosure is described.

The aforesaid streaming data providing method through a node interworking with and connected to at least one base station (BS) according to an embodiment may be provided in the form of a non-transitory computer-readable medium suitable for storing computer program instructions and data. A program stored in a non-transitory computer-readable recording medium to implement the streaming data providing method through the BS-interworking node according to an embodiment may execute steps of monitoring MPEG media transport (MMT) streaming data being delivered from a live streaming server to a terminal, detecting whether predetermined event information is contained in the monitored streaming data, replacing a media processing unit (MPU) of the streaming data with a predetermined event unit if the predetermined event information is detected from the streaming data, and delivering the streaming data having the replaced event unit to the terminal.

In this case, a program recorded on the recording medium may perform the above-described functions by being read, installed and executed in the computer.

In order to allow the computer to read the program recorded on the recording medium and to execute the functions implemented by the program, the above-described program may include codes encoded in computer languages such as C, C++, JAVA, and machine language which can be read through a device interface of the computer by a processor (CPU) of the computer.

This code may include a function code related to a function or the like that defines the above-described functions, and may include an execution procedure-related control code necessary for the processor of the computer to execute the above-described functions in accordance with a predetermined procedure. Also, such a code may further include a memory reference related code as to which additional information or media required for the processor of the computer to execute the above-described functions should be referenced at any location (address) of the internal or external memory of the computer. In addition, when the processor of the computer needs to communicate with any other computer, server, etc., which are at remote locations, to perform the above-described functions, the code may further include a communication-related code as to how to communicate with which remote computer, server, etc., what information or media should be transmitted or received during communication, and the like.

This non-transitory computer-readable medium, e.g., a recording medium, suitable for storing computer program instructions and data includes magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), a flash memory, an erasable programmable ROM (EPROM), and an electrically EPROM (EEPROM). A processor and memory may be supplemented by or integrated with specific-purpose logical circuit.

Further, the non-transitory computer-readable recording medium may be distributed over networked computer systems so that computer-readable code can be stored and executed in a distributed fashion. In addition, functional programs and their associated code and code segments for implementing the disclosure may be easily deduced or altered by programmers of the technical field of the disclosure in consideration of the system environment of a computer that reads a recording medium and executes the program.

While the disclosure contains many specific implementation details, these should not be construed as limitations on the scope of the disclosure or of what may be claimed, but rather as descriptions of features that may be specific to particular embodiments of particular disclosure. Certain features that are described in the disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

What is claimed is:

1. A node interworking with and connected to at least one base station (BS), the BS-interworking node comprising:
    a monitoring circuit, implemented by a processor, configured to monitor MPEG media transport (MMT) streaming data being delivered from a live streaming server to a terminal;
    an event detecting circuit, implemented by a processor, configured to detect whether the MMT streaming data contains predetermined event information or predetermined event release information when the monitoring circuit monitor the MMT streaming data; and
    a media processing circuit, implemented by a processor, configured to
        (i) replace a media processing unit (MPU) of the MMT streaming data with a predetermined event unit when the event detecting circuit detects the predetermined event information from the MMT streaming data, and to deliver the streaming data having the replaced event unit to the terminal, and
        (ii) bypass the MMT streaming data being delivered from the live streaming server to the terminal without replacing the MPU of the MMT streaming data with the predetermined event unit when the event detecting circuit detects the predetermined event release information from the MMT streaming data.

2. The BS-interworking node of claim 1, wherein when predetermined event signaling is received from the live streaming server or when predetermined information is contained in a header or data information of the MPU, the event detecting circuit determines that the predetermined event information is contained in the MMT streaming data.

3. The BS-interworking node of claim 1, further comprising:
    a user information collecting circuit configured to collect user information about at least one terminal connected to the base station.

4. The BS-interworking node of claim 3, wherein the media processing circuit is further configured to select and extract the predetermined event unit corresponding to the terminal, based on the user information collected by the user information collecting circuit, and to replace the MPU with the extracted event unit.

5. The BS-interworking node of claim 3, wherein the media processing circuit is further configured to identify a block size of the MPU through header information of the MPU, to adjust a block size of the predetermined event unit according to the identified block size, and to replace the MPU with the predetermined event unit having the adjusted block size.

6. A method for providing streaming data through a node, including a processor which is integrated with specific-purpose logical circuit, interworking with and connected to at least one base station (BS), the method, executed by the processor, comprising steps of:
    monitoring MPEG media transport (MMT) streaming data being delivered from a live streaming server to a terminal;
    detecting whether predetermined event information or predetermined event release information is contained in the monitored streaming data;
    replacing a media processing unit (MPU) of the streaming data with a predetermined event unit when the predetermined event information is detected from the streaming data, and delivering the streaming data having the replaced event unit to the terminal; and bypassing, when the predetermined event release information is detected from the streaming data, the streaming data being delivered from the live streaming server to the terminal without replacing the MPU of the streaming data with the predetermined event unit.

7. The method of claim 6, further comprising:
after the delivering step,
further detecting predetermined event release information from the streaming data; and
bypassing the streaming data being delivered from the live streaming server to the terminal when the predetermined event release information is detected from the streaming data.

8. A non-transitory computer-readable recording medium storing a program for executing the streaming data providing method, the program, executed by a processor including electronic circuits, comprising steps of:

monitoring MPEG media transport (MMT) streaming data being delivered from a live streaming server to a terminal;

detecting whether predetermined event information or predetermined event release information is contained in the monitored streaming data;

replacing a media processing unit (MPU) of the streaming data with a predetermined event unit when the predetermined event information is detected from the streaming data, and delivering the streaming data having the replaced event unit to the terminal;

bypassing, when the predetermined event release information is detected from the streaming data, the streaming data being delivered from the live streaming server to the terminal without replacing the MPU of the streaming data with the predetermined event unit.

* * * * *